Patented Sept. 16, 1947

2,427,642

UNITED STATES PATENT OFFICE 2,427,642

RAPIDLY SOLUBLE TETRASODIUM PYROPHOSPHATE

Adam G. Aitchison, Westfield, N. J., assignor to Westvaco Chlorine Products Corporation, New York, N. Y., a corporation of Delaware No Drawing. Application May 28, 1942, Serial No. 444,886

2 Claims. (Cl. 23—107)

This invention relates to phosphate products and more particularly it relates to an improved tetrasodium pyrophosphate product.

Tetrasodium pyrophosphate ($Na_4P_2O_7$) has a variety of uses including application as a detergent, wetting agent, emulsifying and deflocculating agent, builder in soap, and other similar applications. For these uses it is ordinarily sold as powdered anhydrous tetrasodium pyrophosphate ($Na_4P_2O_7$) or as tetrasodium pyrophosphate decahydrate ($Na_4P_2O_7 \cdot 10H_2O$). In either of these forms the product is subject to certain disadvantages. The powdered anhydrous tetrasodium pyrophosphate is difficultly soluble and tends to ball up when brought in contact with water. On the other hand, the decahydrate is easily soluble but it contains considerable water so that it is necessary to use considerably more of it than of the anhydrous product. Also, the decahydrate is more expensive per unit of $Na_4P_2O_7$ than the anhydrous material.

Accordingly, among the objects achieved by my invention is a new, free flowing, readily soluble tetrasodium pyrophosphate product. Another object achieved is a process for making a partially hydrated, powdered tetrasodium pyrophosphate product. Still another object achieved by my invention is the provision of a cheap tetrasodium pyrophosphate product in powder form that is suitable for water treatment applications and for incorporation in dry detergent products.

I have discovered that anhydrous tetrasodium pyrophosphate is rendered readily soluble in water and free flowing if a controlled amount of water is added to it. I have found that a rate of solubility equivalent to that of the decahydrate and approximately twice that of the anhydrous material can be secured if tetrasodium pyrophosphate is partially hydrated within the range of 15–30 percent water. A product which is satisfactory generally for most applications contains about 20 percent water, and this is my preferred composition.

The partially hydrated product is prepared by spraying a predetermined quantity of water within the limits of 15–30 percent into comminuted anhydrous tetrasodium pyrophosphate. The hydration may be carried on batchwise using a suitable type of dry mixer but I prefer to hydrate continuously in a screw conveyor spraying the water into the material as it passes through the conveyor.

As an example of the method of preparation, I sprayed 337 pounds of anhydrous tetrasodium pyrophosphate comminuted to about 95 percent minus 100 mesh with 116 pounds of water over a period of 1.75 hours in a dough type mixer. The final product contained 22 percent water. There was a loss of water during the operation of approximately 24 pounds. The product was screened to remove lumps leaving a finely divided solid product which was rapidly soluble in water and was suitable for use as a detergent and for water softening. It is also satisfactory to add the water to a granular anhydrous material and to grind after hydration to the desired degree of fineness.

The partially hydrated product has a number of advantages. It is as soluble as tetrasodium pyrophosphate decahydrate but may be prepared more cheaply since an expensive crystallizing operation is avoided. For most applications the product is used as a powder. It is also more satisfactory than the decahydrate because less material is required for a unit of $P_2O_5$ and shipping costs are lower.

It is believed that the product consists of tetrasodium pyrophosphate decahydrate and anhydrous tetrasodium pyrophosphate particles intimately admixed. When no tetrasodium pyrophosphate decahydrate particles are present the particles in the product tend to adhere tightly to adjacent particles forming a closely packed ball. The decahydrate particles in my product serve to baffle the anhydrous particles and the aggregates are prevented from growing by the hydrate crystals. The effect may be described as a protective shell of hydrated particles surrounding the anhydrous ones, preventing the formation of aggregates of anhydrous particles.

What I claim is:

1. As a new composition of matter, powdered anhydrous tetrasodium pyrophosphate, containing sufficient tetrasodium pyrophosphate decahydrate formed in situ on the anhydrous material so that the total content of combined water in the composition is within the range of 15 to 30 percent by weight.

2. The method of preparing an improved tetrasodium pyrophosphate composition which comprises adding from 10 to 30% of water to anhydrous tetrasodium pyrophosphate during agitation of the anhydrous tetrasodium pyrophosphate and forming the partially hydrated tetrasodium pyrophosphate into a powder of the desired degree of fineness.

ADAM G. AITCHISON.

REFERENCES CITED

The following references are of record in the file of this patent:

UNITED STATES PATENTS

| Number | Name | Date |
|---|---|---|
| 1,700,116 | Blumrich | Jan. 29, 1929 |
| 1,979,926 | Zinn | Nov. 6, 1934 |
| 2,244,158 | Hubbard et al. | June 3, 1941 |
| 2,032,388 | Allen | March 3, 1936 |
| 2,326,949 | Kepfer | Aug. 17, 1943 |

OTHER REFERENCES

Mellor, "Treatise on Inorganic and Theoretical Chemistry," vol. II, page 863 (Longmans, New York, 1922).

Merck Index, 5th edition, page 518 (Merck & Co., Rahway, N. J., 1940).

Gmelin, "Handbuch der Anorganischen Chemie," 8 Auflage; Teil 21; page 913 (Berlin, 1928).